(12) United States Patent
Jager et al.

(10) Patent No.: US 8,015,481 B2
(45) Date of Patent: Sep. 6, 2011

(54) METHOD FOR GENERATING SOURCE CODE IN A PROCEDURAL, RE-ENTRANT-COMPATIBLE PROGRAMMING LANGUAGE USING A SPREADSHEET REPRESENTATION

(75) Inventors: Bruno Jager, Munich (DE); Matthias Rosenau, Munich (DE)

(73) Assignee: Xapio GmbH (DE)

( * ) Notice: Subject to any disclaimer, the term of this patent is extended or adjusted under 35 U.S.C. 154(b) by 1380 days.

(21) Appl. No.: 11/057,430

(22) Filed: Feb. 14, 2005

(65) Prior Publication Data
US 2005/0188352 A1   Aug. 25, 2005

(30) Foreign Application Priority Data
Feb. 17, 2004   (DE) .......................... 10 2004 007 638

(51) Int. Cl.
*G06F 17/00* (2006.01)
(52) U.S. Cl. ....................................... 715/212; 715/219
(58) Field of Classification Search .................. 715/212, 715/213, 217, 220, 219
See application file for complete search history.

(56) References Cited

U.S. PATENT DOCUMENTS

| | | | | |
|---|---|---|---|---|
| 4,575,813 A * | 3/1986 | Bartlett et al. | ................ | 715/217 |
| 5,857,211 A * | 1/1999 | Carper et al. | ................ | 715/236 |
| 5,987,517 A * | 11/1999 | Firth et al. | ................ | 709/230 |
| 6,604,102 B2 * | 8/2003 | Klein et al. | ............................ | 1/1 |
| 6,631,497 B1 * | 10/2003 | Jamshidi et al. | ............. | 715/205 |
| 6,983,270 B2 * | 1/2006 | Rippich | .............................. | 1/1 |
| 7,120,866 B2 * | 10/2006 | Kotler et al. | .................. | 715/209 |
| 7,167,868 B2 * | 1/2007 | Shin | .............................. | 707/101 |
| 7,233,956 B2 * | 6/2007 | Balducci et al. | ....................... | 1/1 |
| 7,415,664 B2 * | 8/2008 | Aureglia et al. | ............... | 715/212 |
| 7,636,882 B2 * | 12/2009 | Aureglia et al. | ............... | 715/227 |
| 7,853,867 B2 * | 12/2010 | Egilsson | ........................ | 715/212 |
| 2001/0056440 A1 * | 12/2001 | Abramson et al. | ............. | 707/504 |
| 2002/0055953 A1 * | 5/2002 | Tesch et al. | .................... | 707/504 |
| 2003/0188256 A1 * | 10/2003 | Aureglia et al. | ............... | 715/503 |
| 2004/0133567 A1 * | 7/2004 | Witkowski et al. | ................ | 707/3 |
| 2004/0181748 A1 * | 9/2004 | Jamshidi et al. | ............... | 715/503 |
| 2004/0186860 A1 * | 9/2004 | Lee et al. | ........................ | 707/200 |
| 2004/0205524 A1 * | 10/2004 | Richter et al. | ................. | 715/503 |
| 2004/0254948 A1 * | 12/2004 | Yao | ................................ | 707/101 |

(Continued)

OTHER PUBLICATIONS

Iwerks et al., The Internet Spatial Spreadsheet: Enabling Remote Visualization of Dynamic Spatial Data and Ongoing Query Results over a Network, ACM 2003, pp. 154-160.*

(Continued)

*Primary Examiner* — Cong-Lac Huynh
(74) *Attorney, Agent, or Firm* — Nields, Lemack & Frame, LLC

(57) ABSTRACT

A method for operating a computer which has access to data of a database, is disclosed. The method includes the steps of: creating a spreadsheet using a table calculation program; defining logic operations between various cells of the spreadsheet; defining an assignment of the data from the database to the cells of the spreadsheet; and generating a source code of a procedural, re-entrant-compatible programming language from the spreadsheet, which when called, reads data from the database, executes a logic operation on it and outputs the result of the logic operation. Also disclosed is a method for generating source code in a procedural, re-entrant-compatible programming language from a spreadsheet representation, wherein a source code is generated from a representation of algorithms and/or data in one or more spreadsheets in such a way that cell areas with the same formula structure are mapped onto one or more methods of the programming language.

9 Claims, 13 Drawing Sheets

U.S. PATENT DOCUMENTS

| | | | |
|---|---|---|---|
| 2005/0010862 A1* | 1/2005 | Bauchot | 715/504 |
| 2005/0039113 A1* | 2/2005 | Balducci et al. | 715/503 |
| 2005/0097447 A1* | 5/2005 | Serra et al. | 715/503 |
| 2005/0108623 A1* | 5/2005 | Bedford et al. | 715/503 |
| 2006/0048044 A1* | 3/2006 | Genesereth et al. | 715/503 |
| 2006/0053363 A1* | 3/2006 | Bargh et al. | 715/503 |
| 2006/0080595 A1* | 4/2006 | Chavoustie et al. | 715/503 |
| 2006/0080596 A1* | 4/2006 | Bhogal et al. | 715/503 |
| 2006/0101326 A1* | 5/2006 | Todd | 715/503 |
| 2006/0107196 A1* | 5/2006 | Thanu et al. | 715/503 |
| 2006/0136808 A1* | 6/2006 | Chirilov et al. | 715/503 |
| 2007/0055661 A1* | 3/2007 | Witkowski et al. | 707/4 |
| 2007/0130136 A1* | 6/2007 | Cambot et al. | 707/4 |
| 2007/0277090 A1* | 11/2007 | Raja et al. | 715/503 |

OTHER PUBLICATIONS

Jones et al., A User-Centred Approach to Functions in Excel, ACM 2003, pp. 165-176.*

Francoeur, Algorithms Using Java for Spreadsheet Dependent Cell Recomputation, Google 2003, pp. 1-23.*

Reinwald et al., Heterogeneous Query Processing through SQL Table Functions, IEEE 1999, pp. 1-8.*

Haas et al., Data Integration through Database Federation, IEEE 2002, pp. 578-596.*

* cited by examiner

Sheet1

Sheet2

|   | A | B |
|---|---|---|
| 1 | = activate(B2 = Sheet1!E5) | EURO |
| 2 | 20100 | |
| 3 | | |

Sheet2(1)

|   | A | B |
|---|---|---|
| 1 | = activate(B2 = Sheet1!E5) | YEN |
| 2 | 500 | |
| 3 | | |

Sheet2(2)

|   | A | B |
|---|---|---|
| 1 | = activate(B2 = Sheet1!E5) | USD |
| 2 | 10200 | |
| 3 | | |

Sheet2(3)

FIG. 3

|    | B | C | D | E | F | G | H | I | J | K | L | M |
|----|---|---|---|---|---|---|---|---|---|---|---|---|
| 1  |   |   |   |   |   |   |   | = D9 | = I1 | = I1 | = I1 |   |
| 2  |   |   |   |   |   |   |   | = D10 | = I2 |   | = I2 |   |
| 3  |   |   |   |   |   |   |   |   |   |   | = I3 |   |
| 4  |   |   |   |   |   |   |   |   |   |   |   |   |
| 5  |   |   |   |   |   |   |   |   |   |   |   |   |
| 6  |   |   |   |   |   |   |   |   |   |   |   |   |
| 7  |   |   |   |   |   |   |   |   |   |   |   |   |
| 8  | Customer ID | Last Name |   |   |   |   |   |   |   |   |   |   |
| 9  | 4711 | Miller | = B9 | = B9 + B10 | = B9 | = B9 | = B11 + B12 |   | xxxx |   | = B9 |   |
| 10 | 4712 | Meyer | = B10 | = B10 + B11 | = $B10 | = B9 | = B12 + B13 |   |   |   | = B9 |   |
| 11 |   |   |   |   |   |   |   |   |   |   |   |   |

FIG. 4

|   | A | B | C | D | E |
|---|---|---|---|---|---|
| 1 |   | select |   |   |   |
| 2 |   | Customer ID | Last Name |   | 1 |
| 3 |   | 4711 | Miller | = B9+E9 | = E8+1 |
| 4 |   | 4712 | Meyer | = B10 + E10 | = E9+1 |
| 5 |   |   |   |   |   |

|    | A | B | C | D | E |
|----|---|---|---|---|---|
| 1  |   |   |   |   |   |
| 2  |   |   |   | = sum(B9:B10) | =sum(B9:B10) |
| 3  |   |   |   | = sum(B9:B$10) | =sum(B10:B11) |
| 4  |   |   |   |   |   |
| 5  |   |   |   |   |   |
| 6  |   |   |   |   |   |
| 7  | select |   |   |   |   |
| 8  | Customer ID | Last Name |   |   |   |
| 9  | 4711 | Miller | =sum(B9:B$10) |   |   |
| 10 | 4712 | Meyer | =sum(B10:B$10) |   |   |
| 11 |   |   |   |   |   |

|   | A | B | C | D | E | F | G | H |
|---|---|---|---|---|---|---|---|---|
| 1 | Customer ID | Product ID | Turnover $ | | | Customer ID | Turnover $ | InsertFlag |
| 2 | 4711 | 201 | 25000 | | | =A3 | =(C2+C3)/2 | = if(AND(B3 >=200;B3< 300;C3 > 10000);TRUE;FALSE |
| 3 | 4711 | 205 | 500 | | | | | |
| 4 | | | | | | | | |

Fig. 8

Select Supplier,Unit_price From SupplierDB where Product_ID =[B3]

|   | A | B | C | D | E | F | G | H | I | J |
|---|---|---|---|---|---|---|---|---|---|---|
| 1 | Customer ID | Product ID | Units sold | Turnover $ | | | | | | |
| 2 | 4711 | 201 | 10 | 25000 | | | | Supplier | Unit price | |
| 3 | 4711 | 204 | 5 | 500 | | =B2 | | Miller | 100 | =I3*D3 |
| 4 | | | | | | = sum(D2:D3) -D3 | | Meyer | 120 | =I4*D3 |
| 5 | | | | | | | | Taylor | 80 | =I5*D3 |
| 6 | | | | | | | | | | |

Fig. 9

|   | A | B | C | D | E | F |
|---|---|---|---|---|---|---|
| 1 | Customer ID | Product ID | Units sold | Turnover $ | | |
| 2 | 4711 | 201 | 10 | 25000 | | |
| 3 | 5550 | 204 | 5 | 500 | | |
| 4 | 5550 | 295 | 10 | 600 | | = group(A3:D5;A5<>A6) |
| 5 | 5550 | 666 | 9 | 2 | | |
| 6 | 6777 | 204 | 5 | 500 | | |
| 7 | | | | | | |

A3:D5: Example area of the group     Criteria for group change

FIG. 10

|   | A | B | C | D | E | F | G |
|---|---|---|---|---|---|---|---|
| 1 | Customer ID | Product ID | Units sold | Date | Turnover $ | | |
| 2 | 4711 | 201 | 10 | 15-Dec-2004 | 25000 | = Month(D2) | |
| 3 | 5550 | 204 | 5 | 11-Nov-2004 | 500 | = Month(D3) | |
| 4 | 5550 | 295 | 10 | 11-Dec-2004 | 600 | = Month(D4) | = group(A3:D5;OR(A5<>A6;F5<>F6)) |
| 5 | 5550 | 666 | 9 | 12-Dec-2004 | 2 | = Month(D5) | |
| 6 | 6777 | 204 | 5 | 3-Dec-2004 | 500 | = Month(D6) | |
| 7 | | | | | | | |

Change of group on change of customer or month

FIG. 11

|   | A | B | C | D | E | F | G | H |
|---|---|---|---|---|---|---|---|---|
| 1 | Customer ID | Product ID | Units sold | Turnover $ | | | | |
| 2 | 4711 | 201 | 10 | 25000 | | | | |
| 3 | 5550 | 204 | 5 | 500 | =D3/C3 | | | |
| 4 | 5550 | 295 | 10 | 600 | =D4/C4 | = group(A3:D5;A5<>A6) | | |
| 5 | 5550 | 666 | 9 | 2 | =D5/C5 | | | |
| 6 | 6777 | 204 | 5 | 500 | | Customer ID | Units sold | InsertFlag |
| 7 | | | | | | = A5 | =sum(D3:D5) | = true |
| 8 | | | | | | | | |

Formula area growths with group

Sum growths with group

References last row of group

FIG. 12

|   | A | B | C | D | E | F | G | H |
|---|---|---|---|---|---|---|---|---|
| 1 | Customer ID | Product ID | Units sold | Turnover $ | | | | |
| 2 | 4711 | 201 | 10 | 25000 | | | | |
| 3 | 5550 | 204 | 5 | 500 | =D3/C3 | | | |
| 4 | 5550 | 295 | 10 | 600 | =D4/C4 | = group(A3:D5;A5<>A6) | | |
| 5 | 5550 | 666 | 9 | 2 | =D5/C5 | | | |
| 6 | 6777 | 204 | 5 | 500 | | Customer ID | Units sold | InsertFlag |
| 7 | | | | | | = A5 | = AVERAGE(E3:E5) | = true |
| 8 | | | | | | | | |

Fig. 13

|   | A | B | C | D | E | F |
|---|---|---|---|---|---|---|
| 1 | Customer ID | Product ID | Units sold | Turnover $ | | |
| 2 | 4711 | 201 | 10 | 25000 | | |
| 3 | 5550 | 204 | 5 | 500 | | |
| 4 | 5550 | 295 | 10 | 600 | | = group(A3:D5;A5<>A6) |
| 5 | 5550 | 666 | 9 | 2 | | |
| 6 | 6777 | 204 | 5 | 500 | | |
| 7 | | | | | | = C5 - C4 |

FIG. 14

|   | A | B | C | D | E | F | G |
|---|---|---|---|---|---|---|---|
| 1 | Customer ID | Product No | Units sold | turnover $ | | | |
| 2 | 4711 | 201 | 10 | 25000 | | | |
| 3 | 5550 | 204 | 5 | 500 | | | |
| 4 | 5550 | 295 | 10 | 600 | | = group(A3:D5;A5<>A6) | |
| 5 | 5550 | 666 | 9 | 2 | | | |
| 6 | 6777 | 204 | 5 | 500 | | | =OffsetFromEnd(C5-C4) |
| 7 | | | | | | = OffsetFromGroupEnd(C5 - C4) | |

FIG. 15

|   | A | B | C | D | E | F | G |
|---|---|---|---|---|---|---|---|
| 1 | Customer ID | Product ID | Units sold | Date | Turnover $ | | |
| 2 | 4711 | 201 | 10 | 15-Dec-2004 | 25000 | = Month(D2) | |
| 3 | 5550 | 204 | 5 | 11-Nov-2004 | 500 | = Month(D3) | = group(A3:E4;A4<>A5) |
| 4 | 5550 | 666 | 9 | 12-Dec-2004 | 2 | = Month(D4) | |
| 5 | 5550 | 295 | 10 | 11-Dec-2004 | 600 | = Month(D5) | |
| 6 | 5550 | 295 | 10 | 11-Dec-2004 | 600 | = Month(D6) | = group(A6:E7; OR(A7<>A8; F7<>F8)) |
| 7 | 5550 | 295 | 10 | 11-Dec-2004 | 600 | = Month(D7) | |
| 8 | 6777 | 204 | 5 | 3-Dec-2004 | 500 | = Month(D8) | |
| 9 | | | | | | | |

FIG. 16

|   | A | B | C | D | E | F | G |
|---|---|---|---|---|---|---|---|
| 1 | Customer ID | Product ID | Units sold | Date | Turnover $ | | |
| 2 | 4711 | 201 | 10 | 15-Dec-2004 | 25000 | = Month(D2) | |
| 3 | 5550 | 204 | 5 | 11-Nov-2004 | 500 | = Month(D3) | = group(A3:E7;A7<>A8) |
| 4 | 5550 | 666 | 9 | 12-Dec-2004 | 2 | = Month(D4) | |
| 5 | 5550 | 295 | 10 | 11-Dec-2004 | 600 | = Month(D5) | = group(A4:E5;F5<>F6) |
| 6 | 5550 | 295 | 10 | 11-Dec-2004 | 600 | = Month(D6) | |
| 7 | 5550 | 295 | 10 | 11-Dec-2004 | 600 | = Month(D7) | |
| 8 | 6777 | 204 | 5 | 3-Dec-2004 | 500 | = Month(D8) | |
| 9 | | | | | | | |

|   | A | B | C | D | E | F | G | H | I | J | K |
|---|---|---|---|---|---|---|---|---|---|---|---|
| 1 | | | | | | | | | | | |
| 2 | | | | | | | | | | | |
| 3 | Customer ID | Product ID | Turnover | Currency | | Currency | Turnover | RefreshFlag | | Currency | Turnover |
| 4 | 4711 | 500 | 20,5 | EURO | | KA | | = Targetarea(J4:K4) | | EURO | 201000 |
| 5 | | | | | | = D4 | = C4 + K4 | = TRUE | | USD | 5000 |
| 6 | | | | | | | | | | YEN | 2700 |
| 7 | | | | | | | | | | | |

|   | A | B | C | D | E | F | G | H | I | J | K | L | M |
|---|---|---|---|---|---|---|---|---|---|---|---|---|---|
| 1 | | | | | | | | | | | | | |
| 2 | | | | | | | | | | | | | |
| 3 | Customer ID | Product ID | Turnover | Currency | | Currency | Turnover | RefreshFlag | | Currency | Turnover | Currency | Turnover |
| 4 | 4711 | 500 | 20,5 | EURO | | KA | | = Targetarea(J4:K4) | | = L4 | = M4 | EURO | 89000 |
| 5 | | | | | | = D4 | = C4 + K4 | = TRUE | | = L5 | = M5 | Pound | 2005 |
| 6 | | | | | | | | | | = L6 | = M6 | REAL | 100 |
| 7 | | | | | | | | | | = L7 | = M7 | USD | 20000 |
| 8 | | | | | | | | | | = L8 | = M8 | YEN | 1000 |
| 9 | | | | | | | | | | | | | |

FIG. 20

|   | B | C | D | F | G | H | I | J | K |
|---|---|---|---|---|---|---|---|---|---|
| 1 | | | | | | | | | |
| 2 | | | | | | | | | |
| 3 | Currency | DeleteFlag | | Currency | Turnover | RefreshFlag | | Currency | Turnover |
| 4 | | = Targetarea(J4:K4) | | KA | | = Targetarea(J4:K4) | | EURO | 20000 |
| 5 | EURO | = IF(K4<=20000;TRUE;FALSE)TRUE | | EURO | = K4+100 | = TRUE | | Pound | 50 |
| 6 | | | | | | | | REAL | 700 |
| 7 | | | | | | | | USD | 899 |
| 8 | | | | | | | | YEN | 199 |
| 9 | | | | | | | | | |

FIG. 21

|   | B | C | D | F | G | H | I | J | K |
|---|---|---|---|---|---|---|---|---|---|
| 1 | | | | | | | | | |
| 2 | | =Sequence(F3;B3) | | | | | | | |
| 3 | Currency | DeleteFlag | | Currency | Turnover | RefreshFlag | | Currency | Turnover |
| 4 | | = Targetarea(J4:K4) | | KA | | = Targetarea(J4:K4) | | EURO | 20000 |
| 5 | EURO | = IF(K4<=20000;TRUE;FALSE)TRUE | | EURO | = K4+100 | = TRUE | | Pound | 50 |
| 6 | | | | | | | | REAL | 700 |
| 7 | | | | | | | | USD | 899 |
| 8 | | | | | | | | YEN | 199 |
| 9 | | | | | | | | | |

FIG. 22

|   | B | C | D | F | G | H | I | J | K |
|---|---|---|---|---|---|---|---|---|---|
| 1 |   |   |   |   |   | = 5 * H2 |   |   |   |
| 2 |   | =Sequence(H1;F3;B3) |   |   |   | = sum(K3:K8) |   |   |   |
| 3 | Currency | DeleteFlag |   | Currency | Turnover | RefreshFlag |   | Currency | Turnover |
| 4 |   | = Targetarea(J4:K4) |   | KA |   | = Targetarea(J4:K4) |   | EURO | 20000 |
| 5 | EURO | = IF(K4<=20000;TRUE;FALSE)TRUE |   | EURO | = K4+100 | = TRUE |   | Pound | 50 |
| 6 |   |   |   |   |   |   |   | REAL | 700 |
| 7 |   |   |   |   |   |   |   | USD | 899 |
| 8 |   |   |   |   |   |   |   | YEN | 199 |
| 9 |   |   |   |   |   |   |   |   |   |

FIG. 23

Data read into area B2:C2 (formula results shown in brackets)

| A | B | C | D | E | F | F |
|---|---|---|---|---|---|---|
| 1 | Turnaround | salesman |   | salesman | average | Flag |
| 2 | 50000 | 4711 | =changes(c2;0;;this+1)[0] | =c2[0] | =d3[0] | =changes(c2;true;false)[false] |
| 3 |   |   | =if(this=1;b2;this*(d2-1)+b2)/d2 [0] |   |   |   |

Cycle 1: Calculation of all cells (numbers in circles giving oder of calculation)

| A | B | C | D | E | F | G |
|---|---|---|---|---|---|---|
| 1 | Turnaround | salesman |   | salesman | average | Flag |
| 2 | 50000 | 4711 | =changes(c2;0;this+1) ① [1] | ③ =c2[4711] | ④ =d3[50000] | =changes(⑤; true;false)[false] |
| 3 |   |   | =if(this=1;b2; this*(d2-1)+②2)/d2 [50000] |   |   |   |

Cycle 2: Calculation of cells relating to group change in cell C2 – in this case, there is no change

| A | B | C | D | E | F | G |
|---|---|---|---|---|---|---|
| 1 | Turnaround | salesman |   | salesman | average | Flag |
| 2 | 50000 | 4711 | =changes(c2;0;this+1) [1] | =c2[4711] | =d3[50000] | =changes(c2; true;false)[false] |
| 3 |   |   | =if(this=1;b2; this*(d2-1)+b2)/d2 [50000] |   |   |   |

FIG. 24

Data read into area B2:C2

| A | B | C | D | E | F | G |
|---|---|---|---|---|---|---|
| 1 | Turnaround | Salesman | | Salesman | average | Flag |
| 2 | 100000 | 4711 | =changes(c2;0;;this+1)[1] | =c2[4711] | =d3[50000] | =changes(c2;true;false)[false] |
| 3 | | | =if(this=1;b2;this*(d2-1)+b2)/d2 [50000] | | | |

Cycle 1: Calculation of all cells

| A | B | C | D | E | F | G |
|---|---|---|---|---|---|---|
| 1 | Turnaround | Salesman | | Salesman | average | Flag |
| 2 | 100000 | 4711 | =changes(c2;0;this+1) [2] ① | =c2[4711] ③ | =d3[75000] ④ | =changes(c2;true;false[false] |
| 3 | | | =if(this=1;b2;this*(d2-1)+b2)/d2 [75000] ② | | | |

Cycle 2: Calculation of cells relating to group change in cell C2 – In this case, group changes

| A | B | C | D | E | F | G |
|---|---|---|---|---|---|---|
| 1 | Turnaround | Salesman | | Salesman | average | Flag |
| 2 | 100000 | 4711 | =changes(c2;0;this+1) [0] | =c2[4711] | =d3[75000] | =changes(c2;true;false)[true] |
| 3 | | | =if(this=1;b2;this*(d2-1)+b2)/d2[75000] | | | |

FIG. 25

Select Security, Covariance from CovarianceTable where RefSecurity = [A3]

Select Security from AssetDB

| | A | B | C | D | E | F | G |
|---|---|---|---|---|---|---|---|
| 1 | | | | | | | |
| 2 | Security | | Security | Covariance | | | |
| 3 | 4711 | | 4712 | 0,6 | | | |
| 4 | | | 4713 | -0,3 | | | |
| 5 | | | | | | | |
| 6 | | | | | Security | Covariance | InsertFlag |
| 7 | | | | | = A3 | = AVERAGE(D3:D4) | =TRUE |
| 8 | | | | | | | |

Insert Security, Covariance into AverageCovarianceTable

FIG. 26

|   | A | B | C | D | E | F |
|---|---|---|---|---|---|---|
| 1 | | | | | | |
| 2 | Security | | Security | Covariance | | |
| 3 | 4711 | | 4712 | 0,6 | | |
| 4 | | | | | | |
| 5 | | | | | | |
| 6 | | | | Security | Covariance | InsertFlag |
| 7 | | | = changes(A3;0;this+1 +0*D3)) | = A3 | = IF(C7=1;D3; (this*(C7-1)+D3)/C7) | = changes(A3;TRUE;FALSE) |
| 8 | | | | | | |
| 9 | | | | | | |

FIG. 27

Select Security from AssetDB

Select Rate, Date from RateTable where Security=[A3]

|   | A | B | C | D | E | F | G | H | I | J |
|---|---|---|---|---|---|---|---|---|---|---|
| 1 | | | | | | | | | | |
| 2 | Security | | | | | | | | | |
| 3 | 4711 | | | | | | | | | |
| 4 | | | | | | | | | | |
| 5 | | | | | | | | | | |
| 6 | Rate | Date | Difference (%) | Rate | Date | Difference (%) | Security | Date | Difference | InsertFlag |
| 7 | 90,2 | 2-Jan-2003 | =(A6-A7)/A7 *100 | 82,72 | 2-Jan-2003 | =(D6-D7)/D7 *100 | = $A$3 | = B7 | = C7 - F7 | = IF(AND(C7>1;F7<-1);TRUE;FALSE) |
| 8 | 90,25 | 3-Jan-2003 | =(A7-A8)/A8 *100 | 83,95 | 3-Jan-2003 | =(D7-D8)/D8 *100 | = $A$3 | = B8 | = C8 - F8 | = IF(AND(C8>1;F8<-1);TRUE;FALSE) |
| 9 | 90,3 | 4-Jan-2003 | =(A8-A9)/A9 *100 | 81,6 | 4-Jan-2003 | =(D8-D9)/D9 *100 | = $A$3 | = B9 | = C9 - F9 | = IF(AND(C9>1;F9<-1);TRUE;FALSE) |
| 10 | | | | | | | | | | |

Select Rate, Date from RateTable where Security='999'

Insert Security, Date, Difference into DifferenceTable

FIG. 28

|   | A | B | C | D | E | F | G | H | I | J |
|---|---|---|---|---|---|---|---|---|---|---|
| 1 |   |   |   |   |   |   |   |   |   |   |
| 2 | Security |   | = Entry(A2:B3, "comparison") |   |   |   |   |   |   |   |
| 3 | 4711 |   |   |   |   |   |   |   |   |   |
| 4 |   |   |   |   |   |   |   |   |   |   |
| 5 |   | =Entry(A6:B9, "initialize") |   |   |   |   | =Return(G6:J9) |   |   |   |
| 6 | Rate | Date | Difference (%) | Rate | Date | Difference (%) | Security | Date | Difference | InsertFlag |
| 7 | 90,2 | 2-Jan-2003 | =(A6-A7)/A7 *100 | 82,72 | 2-Jan-2003 | =(D6-D7)/D7 *100 | = $A$3 | = B7 | = C7 - F7 | = IF(AND(C7>1;F7<-1);TRUE;FALSE) |
| 8 | 90,25 | 3-Jan-2003 | =(A7-A8)/A8 *100 | 83,95 | 3-Jan-2003 | =(D7-D8)/D8 *100 | = $A$3 | = B8 | = C8 - F8 | = IF(AND(C8>1;F8<-1);TRUE;FALSE) |
| 9 | 90,3 | 4-Jan-2003 | =(A8-A9)/A9 *100 | 81,6 | 4-Jan-2003 | =(D8-D9)/D9 *100 | = $A$3 | = B9 | = C9 - F9 | = IF(AND(C9>1;F9<-1);TRUE;FALSE) |
| 10 |   |   |   |   |   |   |   |   |   |   |

FIG. 29

Call to procedure „comparison"

Defines return area

|   | A | B | C | D | E | F | G | H | I | J |
|---|---|---|---|---|---|---|---|---|---|---|
| 1 |   |   |   |   |   |   |   |   |   |   |
| 2 | Security 1 | Security 2 | = Entry(A2:B3, "comparison") |   |   |   |   |   |   |   |
| 3 | 4711 | 4712 |   |   |   |   |   |   |   |   |
| 4 |   |   |   |   |   |   |   |   |   |   |
| 5 |   |   |   |   |   |   | =Return(G6:J9) |   |   |   |
| 6 | Rate | Date | Difference (%) | Rate | Date | Difference (%) | Security | Date | Difference | InsertFlag |
| 7 | 90,2 | 2-Jan-2003 | =(A6-A7)/A7 *100 | 82,72 | 2-Jan-2003 | =(D6-D7)/D7 *100 | = $A$3 | = B7 | = C7 - F7 | = IF(AND(C7>1;F7<-1);TRUE;FALSE) |
| 8 | 90,25 | 3-Jan-2003 | =(A7-A8)/A8 *100 | 83,95 | 3-Jan-2003 | =(D7-D8)/D8 *100 | = $A$3 | = B8 | = C8 - F8 | = IF(AND(C8>1;F8<-1);TRUE;FALSE) |
| 9 | 90,3 | 4-Jan-2003 | =(A8-A9)/A9 *100 | 81,6 | 4-Jan-2003 | =(D8-D9)/D9 *100 | = $A$3 | = B9 | = C9 - F9 | = IF(AND(C9>1;F9<-1);TRUE;FALSE) |
| 10 |   |   |   |   |   |   |   |   |   |   |

Select Rate, Date From RateTable where Security = [A3]

Select Rate, Date From PriceTable where Security = [B3]

FIG. 30

METHOD FOR GENERATING SOURCE CODE IN A PROCEDURAL, RE-ENTRANT-COMPATIBLE PROGRAMMING LANGUAGE USING A SPREADSHEET REPRESENTATION

The present invention relates to a method for generating source code in a procedural, re-entrant-compatible programming language on the basis of solution representations such as are known from calculation programs which are, however, expanded with essential elements. These representation elements relate, in particular, to the handling of data sources and data sinks with which the generated program communicates. In practice, the "database" data source/data sink is the most significant.

Commercially available database programs such as, for instance, SQL server from Microsoft, provide the user with the possibility of executing algorithms and/or mathematical or logic operations on the respective data. However, this requires knowledge of the programming language of the database program.

Users who rarely execute such operations and/or work with various database programs often come to grief on the relatively complex syntax or on the differences between the respective programming languages. For this reason it has been necessary to entrust specialists with the creation of the corresponding programs. This is relatively expensive, time-consuming and does not provide the degree of flexibility which is necessary in every day life.

As an alternative it has been known to extract the data from the database and process it using a general programming language, for example Basic, Java or C++ and then store the result again in the database. However, this also requires good knowledge of the selected programming language and therefore has usually also been the preserve of experts.

Otherwise, table calculation programs, for example Excel, Lotus, etc. are widespread. These programs use what are referred to as spreadsheets (for example generated with the standard application table calculation programs EXCEL, LOTUS etc.) which contain algorithms and/or data in a 2-dimensional matrix representation. It is possible to integrate data from a database into the arithmetic cells of a calculation program, but this is restricted to the initial provision of the program with data. At most, the cell areas which are adjacent to the read-in area are adapted to the row length of the read area using formulas. Dependencies between the database read instructions and the data/formulas of the calculation program are not provided. Likewise, formula structures are not adapted to the read-in areas if they are not directly or indirectly adjacent to it. It is also a disadvantage that the conventional table calculation programs are restricted in terms of the size of the respective tables. It is therefore not possible to export the contents of relatively large databases directly into such programs. Furthermore, the conventional spreadsheets can be executed only on PC environments on which the standard application table calculation programs are executed.

The object of the invention is therefore to make available a method and a computer program product for simplifying the processing of data from databases and also from other data sources (for example sequential files, other spreadsheets) by means of algorithms and/or mathematic or logic operations.

The invention proposes the method disclosed in patent claim 1 as a solution.

The widespread dissemination of table calculation programs such as, for example, Excel, has resulted in the fact that even computer users who do not have programming experience use the familiar interface of their table calculation program to carry out calculations and logic operations within the spreadsheet. Thus, for example in Excel it is very easy to multiply the number of a table location by that of another table location and to store the result in a third table location.

The invention exploits this fact by using Excel as an "editor" (development program) for developing a new type of calculation program. In Excel, solution examples are presented so that a number of the calculations are already presented by way of example at the development stage. From the proposed solution, the actual calculation program is generated in a standard language (e.g. Java, C++, C#) using a "generator" (that is to say once again a computer program). Said calculation program can either be made to be executed in the same environment or else can also be used as part of a conventionally developed program, depending on how widespread the "target language" even on different computer platforms.

The invention provides, for example, for the Excel environment with which the user is familiar to be used to define the logic operation on data from one or more databases. This is set up using one or two, possibly more, example data records. An executable program (Java) which then when called reads the data from the database/databases, carries out the corresponding calculation/logic operation and stores the results in a database or a new spreadsheet depending on requirements, is then generated from the description of the Excel spreadsheet.

In other words, the invention comprises providing a method and a computer program product with which the exemplary algorithms and/or data represented in a spreadsheet can be processed dynamically.

The method according to the invention with which a source code is generated automatically from a representation of exemplary algorithms and/or data in one or more spreadsheets so that cell areas with the same formula structure are mapped onto the one or more methods of a procedural programming language such as, for example, C and Java, with algorithms firstly being formulated in a nonprocedural fashion using conventional spreadsheet programs but calculations can be carried out on different platforms on which the spreadsheet programs per se cannot be executed (for example on mainframe computers, computer networks). In addition, in the procedural programming language it is possible to calculate dynamically large data stocks and extensive data records.

This invention and further improvements according to the invention in terms of the processing of algorithms and/or data in spreadsheets are described in more detail below with reference to the drawings, in which:

FIG. 1 shows the principle of generation of source codes;

FIGS. 2 and 3 show an example of the use of "activate" formulas;

FIGS. 4 to 6 show examples of the use of "selects";

FIGS. 7 and 8 show examples of transaction-oriented calculations;

FIG. 9 shows a further example of the "transaction";

FIGS. 10 to 17 show examples of the description of groups and example areas;

FIGS. 18 to 20 show examples of the description of source/sink pairs as a further method of successively building up data in the calculation program;

FIGS. 21 to 23 show examples of the explicit stipulations of sequences with cell logic operations; and FIGS. 24 and 25 show examples of the "memory" function; and FIGS. 26 to 30 show examples of "sources", "group change", "this" and "status".

Figures 1, 2:
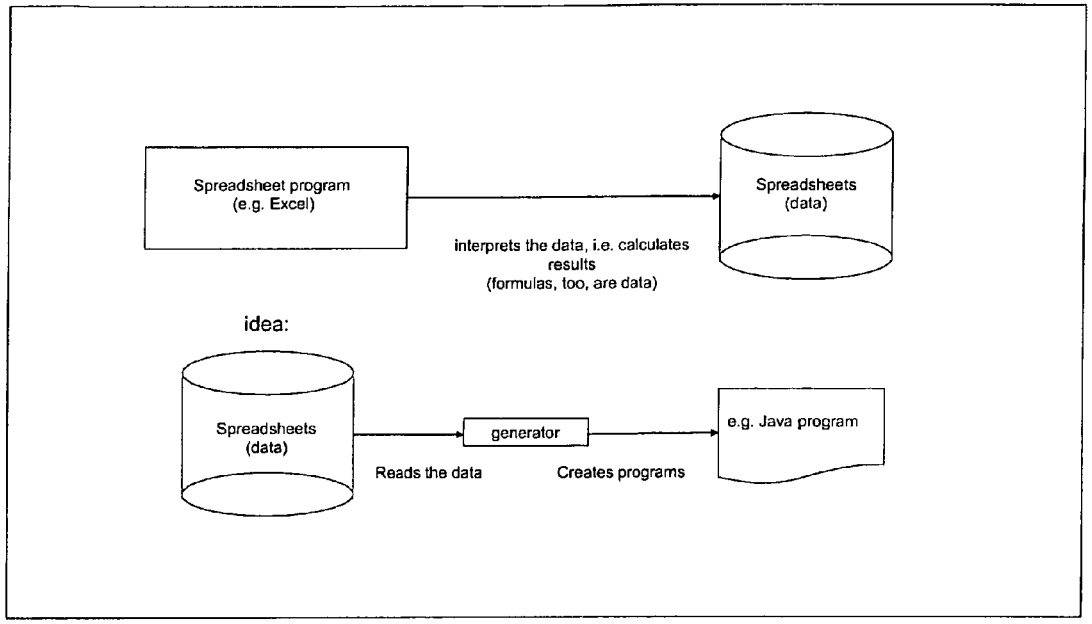

The invention will be described in detail below using examples and embodiments.

Generation of Source Code in Re-Entrant-Compatible, Procedural Higher Programming Languages from Spreadsheets Principle:

A program is automatically generated in a procedural, re-entrant-compatible programming language (for example conventional programming languages such as Java, C, C#) from the representation of algorithms and/or data in one or more spreadsheets, in such a way that coherent cell areas with the same formula structure are mapped onto one or more methods of the language which calculate these cells using simple or double loop structure. For this purpose, the cell area is decomposed in two "rectangular formula areas", for each of which there is a corresponding method of the target language. This is always possible because individual cells can also be mapped onto methods. However, in order to generate as few methods as possible, the cell area is economically covered with rectangles. This principle of programming is clarified schematically in FIG. 1.

All the methods for calculating all the "cells" are called from one control method, which is also generated. The sequence is derived from the dependencies between the formulas.

Explanations:

"Mapping cell areas with the same structure onto one method" means that the program code of one method is generated in the procedural programming language which is embedded for this cell area in the total calculation and in principle calculates the same values as those defined by the spreadsheet logic.

"In principle the same" is intended to mean that rounding differences and differences owing to other "basic methods" are possible but the basic functionality is identical.

Exemplary Solution Approaches for a Number of Problem Areas:

If methods which have arisen in this way are recursively dependent (this does not mean that individual cells depend recursively on one another but that in order to calculate all its "cells" a method must make use of "cells" of another method which itself requires result cells of the first method), the calculation sequence is determined dynamically—that is to say at the calculation time—exclusively for the "chains" of methods which are connected recursively by calling methods by virtue of the fact that for each cell of the affected formula areas it is recorded whether said cell has already been calculated (in this pass). This ensures that its calculation is not carried out until the specific "required case". A requirement for this solution approach is that the target language is re-entrant-compatible.

If dependencies cannot be detected statically—this is the case, for example, with the "offset" Excel function in which the cell reference is calculated by means of, in some cases, complex formulas as a row/column offset with respect to a base address,

- a plausible assumption about the method calculation sequence is made; in the case of offset, for example the same dependency of the calculated target address as for the base address,
- a warning is generated;
- the user is given the possibility of influencing the calculation sequence by generation data by producing data about the position of the addressed area for the cell areas with such indirect addressing (as this situation is referred to below);
- the user is given the possibility of causing the calculation sequence to be determined dynamically.

Technical Benefit:

By mapping spreadsheets onto procedural languages such as C and Java it is possible to formulate algorithms in a nonprocedural fashion using conventional spreadsheet programs and to carry out the calculations on different platforms on which the spreadsheet programs cannot be executed (for example on mainframe computers, computer networks). It is thus possible to make spreadsheet algorithms available for programs by using the generated programs as subroutines—the spreadsheet program with which the logic was developed does not need to be executable on these execution platforms. However, there may simply be a desire to use the performance advantage of mainframe computers for the calculations.

The described generator approach has, with respect to the interpreter, the advantage in many cases that the logic of the spreadsheet no longer has to be analyzed at the time of the execution of the program but rather is already contained in the generated instruction sequence. As a result, when the same programming language is used a better performance is achieved.

Dynamic Generation of Worksheet Instances During Execution of a Program and, in Association Therewith, Constructs with which Cells of Multiply Instantiated Worksheets can be Referenced Principle:

The concept of a workbook which is composed of a plurality of worksheets is expanded with the possibility of dynamic instantiation of additional copies of a type of sheet (of a sheet which has been designed by the developer).

Dynamic instantiation means that algorithms which are designed by the developer are used to bring about the generation and initialization with data from further copies of a given sheet during program execution (=the calculation). The sheets are included in this calculation in a specific way. This concept is shown schematically in FIG. 3.

This concept includes the following secondary aspects:

Cells of a multiply instantiated sheet can be referred to using the following mechanisms:

- Using "activation functions" in the sheets it is possible to define one or more of these sheets as the "active" one to which the cell references are then made.
- If none of the sheets is active, or a plurality of the sheets are active, the respective first sheet of a given quantity of sheets is referenced.
- Quantors, i.e. spreadsheet basic functions whose parameters can also be cell areas can also process a quantity of sheets where appropriate.

Example:

It will be assumed that the "sum" function can be expanded in such a way that by using "=Sum (Sheet1!A1)" the sum of the values of the cell A1 of all the active copies of sheet 1 is calculated. And by using "=Sum (All(Sheet1!A1)" the sum of all the sheets of this type is calculated.

These language resources are refined by forming sheet tupels: the area (=the sheets of a type of sheet) which a cell formula references can be restricted to a quantity of sheet tupels.

Example 1

=Ifrelational(Specialist!A1=1;Specialist!A1+1)

The active sheets of the type "specialist" in whose cell "A1" there is a 1 are selected in the example. The operation "Specialist!A1+1" is carried out on this quantity of sheets. In the specific case (addition is no quantor) there is only one active sheet "specialist" which fulfills the conditions and this one is taken. Otherwise the "first" of the selected sheets is taken (in the random order outlined, which is however uniquely defined for the present quantity of instances).

Example 2

=Ifrelational(Specialist!A1=AlsoSpecialist!C1;Sum (Specialist!A1))

The combinations of active Specialist/Also Specialist sheets to which the condition applies are selected. For the result this may mean here that the value in A1 of a specialist sheet is added multiply. The procedure is oriented with the select behavior of Joins in SQL and is conclusive.

Explanations:

The following is a possible example of explicit dynamic instantiation:

|   | A | B |
|---|---|---|
| 1 | =new(Sheet1!A1) | |
| 2 | =activate(Sheet!A1 = A1) | |

If the condition in "activate" in cell A2 does not apply to any of the existing sheets of this type, a new one is created in whose cell A1 the value from sheet 1, cell A1 is entered as "new". A plurality of "new" instructions in the same sheet are possible. They are all executed during the instantiation of the sheet.

"activate" formulas are calculated (and the sheet is activated or newly created) as soon as all the calculations, to whose results the activate formula relates, are carried out.

Formulas from other sheets which relate to such multiply instantiated sheets cannot be calculated until after the "activate" formulas of all these sheets.

The formulas of the multiply instantiated sheets are calculated "in parallel": the sequence in which methods are calculated is obtained—as in the case of an individual sheet—from the formula dependencies, but in each case all the "equivalent" cell formulas of the sheets are each calculated directly one after the other before the method of the next cell area is calculated. The term "equivalent" cell formulas refers to cell formulas which calculate the same cell areas in sheets of the same type.

However, only cell formulas of activated sheets are calculated.

In this respect see also FIG. 2 and FIG. 3.

In sheet1, a database table is read into the area B5:E5 row by row. In sheet2, reference is made to the currency in "activate", and in cell A2 the turnover is cumulated. The currency of the sheet is entered in B1 during the instantiation ("new"). If different currencies occur, an instance of sheet2 would be produced for each of the currencies. This is shown in FIG. 3.

Only the activated sheets are calculated, and for this reason only the respective currency is cumulated in each sheet.

Technical Benefit:

Customary spreadsheet programs support the reproduction of cells or rows with formulas and the copying of spreadsheets by the developer, but only by him. These processes are development steps. Dynamic instantiation provides a means of using algorithms at the calculation time to determine how many copies of a sheet are required and then to create them. In this way it is possible to adapt to changing data quantities, for example.

Automatic Expansion of Formula Areas and Area References by Transferring Data from a Data Source Principle:

As a result of the transmission of data from external data sources into an expanding data source area of the spreadsheet (i.e. one which is growing in the row direction), formula areas with the same structure are automatically adapted to the size of data source areas which is changed in comparison with the design sheet. The adaptation follows the logical relationships of the cell formulas by direct and indirect references (indirect ones being made via other cells) to the data source areas and the views of the developer which can be ascertained from the design sheet by example data source assignments and formula area variables which are adapted thereto.

Area references to expanded areas are also expanded, i.e. the referenced area also grows.

The implicit expansion is not restricted to the worksheet which contains the initiating expanded data area.

This principle is clarified in FIG. 4.

Explanations, Exemplary Algorithms:

The data source expands only if its example area has at least two rows and only empty cells follow it. Otherwise, the source is read row by row until the example area is full. There is no dependence on expansion in this case. However, cf. expansions in conjunction with transactions.

So that a formula area (area with structurally identical formulas) is expanded, both the formula itself and the data source in the design sheet must have at least two example rows. The formula of the area must relate to cells or cell areas of this data area by means of relative row references (e.g. =$C1, but not =$C$1). The decisive factor is that the last two rows of the formula area relate to the last two rows of the data area. The cell area after these rows (that is to say the cells in all the following rows) must be empty.

If a formula area does not relate in the described way to the data area of a source but instead to a formula area which can itself be expanded, said formula area can also be expanded itself (transitivity of the expansion by reference).

If the area relates to a plurality of data sources and if it is not also to be synchronized with all of them, in the design areas it is necessary to ensure that they do not, as described, refer to one another in the last two rows. Since the number of example rows is always freely selectable, this is always possible.

If the last two rows a formula area is referenced in a relative fashion by the references in the last two rows of an expandable area and if only empty rows follow that area, it will also be expanded.

An expandable area is expanded by in each case one area row for each row of a data area by which said area "grows" beyond the design area (by transfer of data from the data source). All the data areas of the data sources which are directly or indirectly connected to the expandable area by means of the expansion dependencies described above are taken into account in this context. The area can also expand "negatively".

In the expansion mode fitToMinimum, the expansion is terminated if otherwise formula references would be referenced into empty areas. Cell references in the design sheet which address empty cells which are located "after" an expandable area (that is to say in an empty row which follows such an area) are not taken into account in this abort testing. Likewise, references which explicitly interrogate whether assignment has occurred are not taken into account.

In the expansion mode fitToMaximum, references in empty cells are not abort criterion.

References to expanded areas—as in "sum(A1:B3)"—are expanded if they comprise at least two rows in the design sheet and the address of the lower right hand corner of the area references the last row of an expandable area. However, this does not apply if the referencing formula is associated with a formula area (area of structurally identical formulas) at which this condition applies only in some not all of a plurality of cells of the area. Otherwise, the handling of the referenced areas would vary in spite of the structural equivalence—they would expand in some cells, in other they wouldn't. If the area reference in the design covers (directly or indirectly) a plurality of data areas of expandable areas and if the aforesaid preconditions apply to a plurality of these areas, the expansion in the case of "fitToMinimum" is tailored to the smallest of these areas, and in the case of "fitToMaximum" it is tailored to the largest of these areas.

An example is shown in FIG. 4 and will be explained below:

With the read area (Select reads from the database) under the header cells B8 and B10:

D9:D10 would grow (formula area with the same structure, two rows, relative reference row reference to the last two rows of the Select design area E9:E10 would grow for the same reason F9:F10 would not grow because the formula structure in this area is not uniform;

G9:G10 would not grow because the reference to the Select design area with respect to the row is absolute;

H9:H10 would not grow because no cell is referenced in the Select design area.

I1:I2 would grow (see D9:D10 and transitivity of the expandability);

J1:J2 would not grow because nonempty rows (J9) follow the area;

K1 would not grow because the formula area comprises only one row;

L1:L3 would not grow because the area relates (neither directly nor indirectly) to the last two rows of the Select design area.

M9:M10 would not grow because they are not a formula area with the same structure (relative references to rows/columns must give rise to the same distance from the referenced cell/row/column for each cell of a formula area).

This is shown in more detail in FIG. 4.

Figures 5, 6, 7:
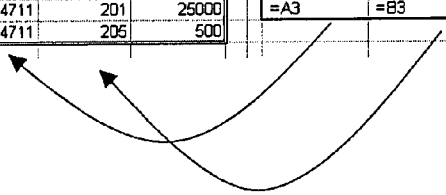

The area E3:E4 would be expanded because it is referenced by the expandable area D3:D4. This is shown in FIG. 5.

Area references in

D2 would grow because the last row of the Select design area is defined as the lower edge of the area;

D3 would grow because the reference to the last row of the Select design area can also be absolute;

In C9:C10 would grow (cf. D2), moreover the formula area would be expanded.

In E2:E3 would not grow because although the preconditions would be met in E2 as they are in D2, the cell is however associated with a formula area with the same structure in which the conditions for the area expansion are fulfilled only in this one cell. The formula area is expanded.

FIG. 6 shows further details.

Definition of Transaction-Oriented Calculations by Describing using Examples

Principle:

If references are made from formulas into a data area or formula area which is dynamic (expanded with a read area or is even a read area itself), and if the area of this formula is not expanded and if the reference is not a cell area which grows with the referenced area, this formula is calculated for each row of the referenced area. Such formulas will be referred to from now on as transaction formulas.

Explanation:

The referencing of cells in the example area of a data source thus always has one meaning:

Expanding areas are detected if the last two rows of a formula area relate to the last two rows of a read area.

Expanding Quantors are detected in the same way.

All the other references to the area are "transaction references" unless the formula is in the area itself—it then references the cell of a preceding/following row.

This results in a significant detail for read-in areas: even read areas which cannot expand (for example because there are filled rows in their way) are completely read through, and the example area then always contains the current row at the last position, the row which is read last but one at the last but one position etc. However, this occurs only if there are transaction references to this area. Otherwise it would be meaningless.

Since read and write operations can also be carried out for each row of a source by means of transaction references and since transaction references to such read areas are also possible, any desired depth of nesting of read operations may occur. This technique provides a means of writing batch programs which successively read the records from a source, read various other data items and subsequently write results which have been generated therefrom or compress them in the main memory for a report.

A formula can easily reference a plurality of read areas by using transaction references. The sequence of these read areas (that is to say the sequence in which the records are read in successively from the individual "transaction sources") is usually already defined by direct references of the read areas. This can be done, for example, by forming Select parameters from database read-in areas from data which has already been read in from other sources. If the read areas are independent (that is to say without mutual reference), a random reading sequence is defined—which is permissible because the Cartesian product of the records of the various sources is clearly to be processed.

FIG. 7 shows an example. Formulas in the example area of the write instruction (insert) in the cells F1 to H2 relate to the cells A3 to C3. The example area F2:H2 does not grow. The direct referencing therefore means here: calculate the cells F2 to H2 each time whenever a row is read into the read area A1:C3. In this case, this also means that each row is copied from the read area into the write area—without the turnover—if its product number is between 200 and 299 and it has a turnover of more than 10000.

In FIG. 7 the read area A1:C3 unnecessarily has two example rows. In FIG. 8 it is necessary owing to the formation of averages. The turnover of two rows of the read area will now be described when the customer and product do not change.

In the present case, the read area A1:C3 unnecessarily has two example rows. In this case, the turnover of two rows of the read area is described when the customer and product do not change.

For the "transaction examples" which is shown in FIG. 9, the following applies in detail:

The relationship "is transaction formula" is transitive.

Read and write areas can also have a transaction character. The Select for the read area in H2:I5 relates here to the cell B3, and for this reason the described Select is to be carried out with each new row in A1:D3.

Transaction formulas can, as is customary, expand with data areas. However, if the formula itself is part of the area which it refers to "in the manner of a transaction", this is a case of a normal formula expansion without a transaction character. This requires in fact that the same cells should be calculated multiply as a sequence of read processes.

Transaction formulas can refer with transaction references (direct or indirect) to more than one data area.

Details are shown in FIG. 9.

The area A1:D3 is a read-in area which can expand

The cell F3 (formula: =B2) relates to a cell of the read-in area, does not expand and is therefore calculated for each new row of the area A1:D3. Note that it always refers to the row before the current row (therefore the first time it refers to B1 instead of B2).

The row F4 relates to an individual cell of the area A1:E3 owing to "–D3" and is therefore calculated for each new row. The expression "sum (D2:D3)" is a quantor which relates to the entire expanded area, that is to say to the sum of the turnovers of all the read-in rows. As a result, in the cell the sum of the turnovers is calculated with each read-in row, but without that of the current row The read-in area H2:I5 relates, via its database Select, to a cell of the read-in area A1:D3, i.e. the Select is carried out with each new row of the read-in area A1:D3. In this case, these are all the suppliers of the product of the currently read row of the area A1:D3 with the respective product price.

The individual price for the article is multiplied by the turnover of the last row of the area A1:D3 in the cell area J3:J5 which is expanded with the read area H2:I5.

Description of Groups by Means of Example Areas

Principle:

Read-in areas can be decomposed into logic groups (successive rows) by marking part of a read area and defining the delimitation criteria. With the part of a read-in area which is marked in this way it is possible to proceed in a similar way to that with a complete area, it is therefore possible also to define, by means of examples, expanding formula areas which expand only with one group.

A transaction reference to the last row of the group has the particular meaning "last row of the group", and reference to the first row of the group has the meaning "first row of the group". Other transaction references are not permissible in this area.

Nested groups are possible and can also be drawn in a nested fashion. In this case transaction references are also possible in all the inner groups, but are again restricted in each case to the first and last rows.

References which are intended to originate expansions (in the case of quantors or expanding formula areas) utilize the group area in the same way as elsewhere the entire read area is utilized: the group area represents the last rows which have been read, and the last row is the current one. Note also that this is true for references in the condition part of the group change definition (see FIG. 10) too.

FIG. 10 is a first example of this. A group is defined in the following example by virtue of the fact that it ends with a change of the customer number (condition A5<>A6 is fulfilled). A5 is the current row, A6 is a "preview row".

In a further example shown in FIG. 11 the group is defined using the formula area F2:F6 (change of month in the date of column D).

Note that in order to determine the group change in the current row it is necessary to read in a further row. It is even necessary to calculate formula cells which depend on this previously read-out row, here: the calculation of the month. Note that it is not possible to carry out all the calculations for this next row which is read out "in reserve" so that the group change of the current row can be determined. Formulas of the row which are read out "in reserve" and for which the following applies directly or indirectly are not yet available:

The calculations are transaction-oriented calculations (formulas which relate to the read area and are calculated again for each row)

They contain constructs which require the end of the group to be already known (for example these are quantors such as "sum" which relate to the entire group)

Moreover, for the example in the design sheet it is completely irrelevant whether the example area A3:D5 which is referenced in the instruction "group" is actually associated in its values with a group (this is of course not the case in the example).

FIG. 12 shows a third example. In this example, quantors and expanding formula areas are defined by making references to the group example area A3:D5:

In F6:H7 a write area is defined whose cell G7 calculates an expanding sum over the group which is defined in cell F4. In particular the sum in G7 is only written at each group change since it is not possible to calculate all the formulas of the write area until this time. In E3:E5 there is a formula area which references the group in A3:D5 in such a way that it expands with the group.

Note that the horizontal expansion of the group area (from A to D) is without significance. Only the reference to a read area and the number of rows is significant, apart from the group change condition itself.

FIG. 13 shows a further example. In this example, the average of the individual prices ("AVERAGE(E3:E5)") is written in place of the turnover sum. The individual prices are formed in the formula area E3:E5 which expands together with the group. This demonstrates that the expansion occurs with groups as well as with the overall read area, that is to say it is also transitive, i.e. the quantor AVERAGE also expands with areas which themselves in turn expand with another area.

A further alternative is shown in FIG. 14, the formula in row F7 relating to individual cells of the group in this example. However, only references to the first and last rows of the group area are permissible in this way. If it is desired to write such a transaction formula (the last but one row minus the last but two row) the example area must be made larger in order to avoid the references extending into the group area. The example would give rise to a fault message.

FIG. 15 shows an example in which F7 "OffsetFromGroupEnd" has the effect of causing cell references in the argument of the instruction to be used in such a way that their row spacing from the last row of the current groups corresponds to that in the example. The references C5 and C4 must both belong to the same example group. It is not sufficient for both to belong to the same group, but one of the references must also belong to a nested subgroup. As explained, such references are otherwise not permitted.

Correspondingly, there is the instruction "OffsetFromGroupStart" for addressing absolute start rows of the group and "OffsetFromStart/OffsetFromEnd" for addressing absolute rows in the entire read area.

Faulty addresses are possible and cause the calculated cell to contain a fault code "Not Available" in Excel according to the usual custom.

Furthermore, FIG. 16 shows an example in which two groups are defined, one when the customer name changes (in cell G3), and another when the customer number or product number changes, (in G6). In fact, the group G4 is a subgroup of that defined in G6. However, it need not be represented in a nested form, i.e. the example areas need not be nested.

Figures 17, 18, 19:
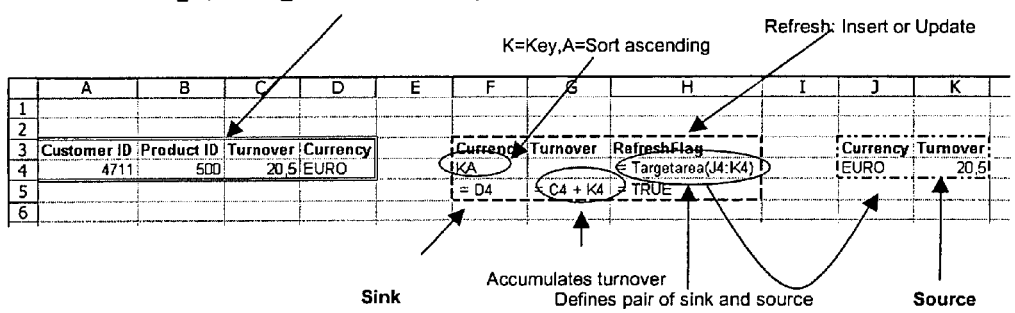

The last example of this is shown in FIG. 17.

In this case, the groups from the preceding example are shown nested. The advantage of this is that the group change condition of the outer group does not need to be repeated in the inner one (outlined by dashed rows).

Source/Sink Pairs as a Further Method of Successively Building Up Data in the Calculation Program Principle:

A sink (write area) is connected to a read area, i.e. the written data is entered into the read area which is thus, if appropriate, expanded, as usual together with the formula areas which are connected thereto via expansion relationships.

An example is shown in FIG. 18

Here, the turnovers from the read area A3:D4 are to be accumulated separately according to currencies in the expandable area J3:K4, sorted in ascending order according to currency. This is brought about by means of a sink F3:H5:

By means of cell H4 "=Targetarea(J4:K4)" the sink is connected to the area J4:K4 which is to be written to, In F4 the column F is defined as a key (K), i.e. after expansion there must not be any two rows with the same currency in the target area J4:K4, The target area J4:K4 is sorted (in the case of expansion) in ascending order according to the currency abbreviation, In G5 the formula "=C4+K4" contains a reference to the target area J4:K4. The effect: if a record is already present in the target area whose currency corresponds to that in the write area, the turnover of said area (K4 stands for this record even if this is perhaps not the 4$^{th}$ row) is added to that of the current record in the read area A3:D4. If there is not yet the currency in the target area, K4 is replaced by 0.

The term "RefreshFlag" in H3 causes the row of the write area to be inserted in the target area if the currency of the write area is not yet present there, but it replaces the row of the target area if the currency is there.

The result after several read-in records would therefore be approximately as shown in FIGS. 19 to 22.

Explanation:

The target area of a sink/source pair is considered as an independent new source to which in turn formulas which expand with this source can relate.

The sink and source of the pair do not expand together

Behind the sink there is no SQL instruction as is the case behind the source A2:D3. The sink is described completely by the specifications in the rows F4:H5.

Of course, rows can also be removed from the target area (instead of "RefreshFlag" "DeleteFlag").

Target areas may have an initializing assignment by means of formulas, for example as in FIG. 21 or 22:

In the read-in area, turnovers are read in—separated according to currency—and transferred into the target area of the sink/source pair by means of formulas.

Explicit Specification of Sequences with Cell Logic Operations

Principle:

"Sequence(<cell1>;<cell2>, . . . )" defines that cell1 is to be calculated before cell2.

Explanations:

As long as only formulas are considered and no read-in areas there is no difficulty in determining the sequence of the calculation from the formula dependencies.

At most, recursions are possible (i.e. a formula refers indirectly to itself, that is to say it already expects a value before it has calculated) but this is a design error (or can it can also be intentionally aimed in Excel, but is not taken into account here).

One exception to this are formula functions with which dynamic references are possible, i.e. those which firstly have to be calculated (e.g. the Excel function "Offset"). However, details have already been given on the solution of problems of this type.

The situation is different if the source is read from but the same source is also changed (refresh, update, delete).

A number of examples are shown in FIGS. 21 to 22.

There is of course a difference depending on whether the "delete" (B3:C5) is carried out first or the refresh in F3:H5 is carried out first. In the first case, 100 Euros remained in the target area J3:K8 at the end, and in the second 20 100 Euros.

This problem ultimately arises because the target area is changed "from the outside" and this is in fact possible multiply. In contrast to this, the customary procedure in calculation programs permits a cell value to be changed only by means of the formula of the cell itself. In this consideration it is insignificant whether the target area is a program-internal "targetarea" or an external database. However, for formulas referring to such sources it may not be possible to decide according to which of the changes they are to calculate without additional information.

"Sequence ( . . . )" is used to bring about reordering of read/write operations or such formula calculations which relate directly or indirectly to read areas.

The cells to which the sequence instruction relates may contain formulas or be part of a write/read area. If any cell of a write area is referenced, it is understood to mean the write area in its entirety.

The sequence instruction may reference a plurality of formulas and read/write areas. Formulas are ordered here only in so far as they are to be carried out before the next read/write area which is referenced in the instruction:

Sequence(A1;C1;write area1)

means that A1 and C1 are to be carried out before the write operation which is described in the write area "write area 1". The instruction therefore does not force A1 to be calculated before B1 in any way.

Incorrect use of the sequence instruction is not ruled out and can arise as a result of the contradiction within their dependencies.

The sequence instruction C2 from FIGS. 22 and 23 ensures that the refresh is carried out before the delete. Instead of F3, it would also have been possible to reference any other cell of the example area F3:H5 in order to relate to the refresh area.

Moreover, the sequence instruction causes, as shown in FIG. 23, the cell H1 (and possibly formulas dependent on it) to be calculated only after the delete. Without a specification, it would be calculated after each operation on the area J3:K8 (note that J3:K8 can also be considered as an independent read area. The sum in H2 is therefore always calculated when the area is read in).

Decomposition of the Individual Calculation Process of Excel Sheets into Clock Cycles which Respectively Take into Account Specific "States" (for Example Change of the Data Configurations of the Data Sources)

Principle:

The calculation of the worksheet in clock cycles by which different cell quantities are affected:

Calculation of all cells (basic clock cycle)

Subsequently: calculation only of cells with formulas which interrogate specific configurations (state-sensitive formulas). If these formulas reference cells which are not calculated in this clock cycle, the data contained therein is used or, if it has not yet been calculated, reacts to an empty cell in the usual way. It would not be calculated now under any circumstances.

A cell can contain formulas for a plurality of clock cycles, it would then be calculated in all these clock cycles, but only with the respectively valid part.

Only the result of the basic clock cycle is retained, and the results of the other clock cycles are deleted at the end of the clock calculation. A single exception to this are cells with "memory" (see below). The use of the additional clock cycles is therefore restricted to "memory" cells and write processes (for example inserts/updates/deletes in databases).

A plurality of computational clock cycles are conceivable for different configurations (for example one clock cycle for "group change of data into data sources is imminent" and one for "end of the program sequence is imminent").

Explanations:

The clocking makes possible a "short-term memory": it is possible to relate to events of a preceding clock cycle without automatically recalculating the cells as a result. Or formulated in other terms: in one clock cycle it is possible, in selected cells, to relate to cells of the preceding clock cycle without automatically recalculating it by means of the reference.

The following example from FIGS. 24 and 25 describes a data source (data area B2:C2) into which the turnovers of sales men (sorted according to sales men) are read in sequentially, one row at a time. In D2, a counter is implemented which references its own cell (cell with memory) by means of "this" and increments in this way. In D3, the turnover average is calculated step by step. The result is placed in the data sink D2:F2 which is written if F2 is "true".

The sales man 4711 has two turnovers. FIG. 24 shows the calculation after the first record (50 000 turnover) has been read in, and the calculation after the second and last record has been read in, of sales man 4711. The values of the cells after the calculation are each placed in square brackets ([ ]).

The instruction "changes" which is introduced by way of example has the syntax "(changes(<celladdress>;<do this>;<do that>)". If a group change in <celladdress> is imminent, <do this> is carried out in the "group change" clock cycle, and <do that> is carried out in the basic clock cycle (for example: clock cycle 1), never in the group change cycle.

Technical Benefit:

The benefit results in contexts in which spreadsheet technology is used in cyclically operating applications. If a processing scheme with data sources and data sinks is defined, the necessity to detect group changes and to be able to react appropriately to them quickly arises. The principle of the "short-term memory" represented is a possible way of treating this change of data configurations.

Note that the handling of group changes by example areas (see above) is technically complex to implement if data sources of any desired size are to be permissible. For example it would be necessary to store expanding formula areas of a group completely in the memory "in some way or other" regardless of how large said group becomes, i.e. it is necessary to use virtual memory techniques. By using clock cycles, the user has the necessary means for describing group changes, calculating cumulative formulas (such as a sum or average) and also resetting again after a group change. It is not necessary to buffer groups, and rows no longer need to be remembered from the input data or to be contained in the example area. However, all the functionality which cannot be calculated incrementally is not available to the user in this case (example: median).

Cell-Oriented Functionalities with Memory

Principle:

A spreadsheet cell has the ability to access the last value which it has itself calculated, and likewise any of its calculated values, back to the last initialization of the cell or start of a program.

Explanations:

Classic spreadsheets do not have any memory of preceding calculations. The transaction cycles however make it sensible to introduce cell functions or cell data types as a result of which the old state (value)/states are not forgotten. The mechanisms may be, for example:

By direct self reference of the cell in its cell formula an implicit definition is made that this cell retains its value after the end of a calculation and can use it as the basis for its next calculation. A reference to these cells in the formulas of other cells leads, as usual, to the execution of the formula with the self reference in this calculation cycle, but the self reference relates to the old value of the cell as a result of the preceding calculations.

Indirect self reference in spreadsheets is possible in many spreadsheet programs in order to permit calculations which require iterations to be carried out within a workbook. A specific form of the memory is also associated with this: first a value with which a calculation is to carry out nonrecursively is entered in one of the recursively associated cells. If a formula is written over the cell afterwards, it is taken as a start value and the recursive calculation is carried out using the start value which is no longer in the cell.

However, this mechanism is entirely different from that previously described for the general memory, because it consists of two design steps (changes of a cell's contents by the developer). The method represented here explicitly permits the referencing of "historic" values in an algorithm, that is to say it is not based on the capability of the development environment of the spreadsheet to infer the author's intention from two algorithm designs.

The history of all the values may be stored, and is thus available, in the cell by means of a variant of the targeted, direct reference of the cell in question.

By means of a further variant of the targeted, direct reference of the cell in question, a logic operation is carried out on the value of the respective individual cycle using a "key" (any other value), is stored and is made available under this key in this and the following cycles of the processing operation.

A number of examples:
=this+1

"this" references the cell itself which contains the formula. In the example, the formula implements a transaction counter (provided that data cells are initialized with 0). For example compressions (accumulation) of data can be carried out over more than one transaction using the technique. A precondition is a differentiated re-initialization of the cells after each individual transaction.

this( ): reference to the vector of the cell values
=this (1)

In this case, compression is not carried out but instead a vector which contains an entry (here: always 1) for each transaction is set up.

this (..,..): reference to the Hashmap of the cell values
=this(Sheet1!a1;Sheet1!b5)

Compression is not carried out here either but instead a Hashmap whose search key is the first argument and its value the second argument is set up. Values with identical keys are overwritten.

The use, i.e. the access to historic values can be configured easily by converting the historic values into a temporary cell area (range) and thus transferring to existing functions, for example =sum(makeRange(sheet1!a1))

The vector a1 (if a vector has been set up in sheet1!a1) is presented to the function sum as a cell area. The sum of its cell values is the result. makeRange could be adapted to various requirements (for example one could be interested either in the keys or in the values or in both of a Hashmap).

Technical Benefit:

The cumulation of values is made possible by the cyclical use of spreadsheets with the memory-related cells. The entire history is interesting if nonlinear functions of the individual values are to be calculated (for example the variance) or linear ones are to be calculated which cannot be calculated incrementally.

EXAMPLES

In the figures referred to in the examples different border lines are used to emphasize cell areas of different type. Thick borders are either data sources or data sinks. They can be distinguished by the rightmost column, headed with a text item with trailing "Flag", only accompanying sinks. Double line borders indicate sources, of which each row will be processed in a transaction. Dashed borders ("--") indicate sink areas, which write into target areas (sink-source pairing). Dashed lines with punctuation ("-..-) indicate the target-area of a sink-source-pair. Cell areas with a thick border, which are part of a larger source area, are group areas.

Sources, group change, this, status

The following example documents the concatenation of data sources, the use of transaction formulas, the status concept and the use of cells with memory.

Areas which are outlined with thick or double line borders are data sources or data sinks. In this case SQL-Selects are behind the data sources (in Excel they are not contained in the cells but rather stored in the background). Sinks are based on SQL-Selects in these examples but are converted into Inserts, Updates and Deletes respectively. However, this is insignificant for the illustration of the programming techniques under consideration. FIG. 26 shows an example of this.

In this example there is a logic operation on two read-in areas. C2:D4 relates in its Select to the security number of the area A2:A3, and is therefore executed for each row of the read-in area A2:A3 and is a "transaction area".

The write area E6:G7 relates both to area A2:A3 and to C2:D4. As a result, it is also carried out for each row of the area A2:A3. AVERAGE(D3:D4) is the average of the covariances from the area C2:D4. It is to be noted that the insert row is carried out as soon as all the formulas of its example area have been carried out.

The same result is obtained in the following example shown in FIG. 27, but the AVERAGE function is modeled with the group change means. The number of covariances in C2:D3 could be as large as desired without memory problems arising; this is because both memory A2:A3 and area C2:D3 do not need to expand.

Cell C7 administers a counter which is set to 0 after the security number has been changed in A3, and is increased after each record in C2:D3. In E7, the average of the covariances is calculated incrementally using this counter. D6:E7 is written in the group change clock cycle if the cell F7 becomes TRUE when the security number is changed in A3. It is to be noted that the counter in C7 is set to 0 at the group change, but that the last calculation of the basic clock cycle is written in E7.

The sequence in detail is as follows:

Security numbers are read in sequentially in A3, and the associated covariances with other securities (C3 and D3) with the further concatenated data source in C2:D3. In C7, the average of the covariance (cell D3) is calculated further item by item. For this purpose, a record counter is required which is formed in C7 and as a result is a cell with a memory. The directly imminent changeover of the security number in A3 brings about the following:

Nothing happens in the first clock cycle of the worksheet calculation of this cycle, i.e. all the cells are attributed to the security 4711 at the last record in C2:D3, "changes (A3; ... )" carries out the false clause, i.e. the expression in the 3rd parameter. changes relates to the logically "true" group change, that is to say it is "true" only in the group change clock cycle.

In the second step, group changes which occur at the next reading operation are logically "true". In the example, the counter C7 is now set to 0, the insert flag is "TRUE", with the consequence that the row D7:E7 is written after this calling of the group change cells. Important: The average C7 was not recalculated in this step, this would also be undesired and would lead to a division by 0.

The insert is subjected directly to a logic operation with C2:D3, i.e. after each read-in in C2:D3 and the necessary calculations of the formulas of the insert data area it is tested whether writing can be carried out again (InsertFlag=true). This occurs for all the clock cycles of the calculation.

FIG. 28 shows an example of the cell expansion.

In the present example, a comparison of its daily rate gains and losses with those of a fixed comparison security (area A6:B9, SecNo 999)) is carried out for selected securities (source A2:A3). Days on which the selected security (rate data in D6:D9) rose by at least 1% and at the same time the comparison security dropped by at least 1% are logged with the date and difference of the % gain.

The rates of the security 999 are independent of the reading area A2:A3 and are therefore read in only once. If the result has more than three rows—that is to say is greater than in the design sheet—this causes the worksheet to expand.

In the expansion variant "fitToMinimum", the expansion is carried out with a read area in such a way that cell references can never point to empty data areas of these or of other read areas. In the case "fitToMaximum", the read area which has been expanded most (in comparison to the size in the design)

determines the degree of expansion of the cell areas. If, for example, the number of cells of A6:B9 is lower than that of D6:E9, this means that in the case of "fitToMinimum": all the formula areas which relate directly or indirectly to the area A6:A9 are expanded or shortened in the length of this area. In the example, this relates to all the areas in the rows 6 to 9 with the exception of the read area D6:E9. The other areas are expanded owing to the transitivity and commutativity of the expansion relationship.

It is to be noted that the expansion in this example is carried out again for each row of the area A2:A3.

Data Sources and Sinks as a Result of Called/Calling Programs

To date, databases have always been used as data sources and sinks, and these are now sources and sinks behind which there are programs, i.e. the calculation program behaves like a subsystem—one with memory (statefull) in the example from FIG. 29.

Once more the covariance of the rate gains of securities is calculated. In this case, the workbook is to receive, as a subsystem, a comparison security together with rate data (source is now the calling program, implemented in the worksheet by "Entry" in B5), and is to be called with a security number (source once more the calling program, implemented using "Entry" in B2), read the rates as well (source is a database, example area is D6:E9), determine the days and make them available to the caller at which the rates and comparison rates satisfy specific criteria, event area is defined (sink) by means of G5 "Return".

The calling sequence in Java could be as follows, for example:

AssetComp.initialize(RateArray);
AssetComp.comparison(4711);
  Date[ ] dates=(Date[ ])AssetComp.return("Date")
    //2$^{nd}$ column of the
    //event area
double[ ] diffs=(double[ ])AssetComp.return("Difference");

Subsystem Without Memory

If the "without memory" (stateless) subsystem is produced there is only a single method for calling it and obtaining the result in the same call. For this reason, only a single statement is appropriate and possible in the spreadsheet, as is only one program Response Statement.

Example

In turn, the security comparison is used as the basis in the example shown in FIG. 30. In this case, two security numbers are transferred and their rates read into two database Selects. The results are in turn in the area of the Return.

The sequence in Java would be, for example:
Comparison[ ] cf=AssetComp.comparison(4711,4712);

The class "comparison" would be generated by the generator:

```
public class comparison( )
{
    public String security ;
    public Date date;
    public double difference;
}
```

The class corresponds to one row of the return area.

The essential terms of the underlying technology such as are used here will be explained once more below briefly.

Absolute Addresses

In Excel, an absolute row or column address is written with a preceding "$", e.g. "$A$1". Of course, "A1" would address the same cell, but the notation has impact on the behavior when designing formula areas by "pulling" formula definitions from a cell to neighboring cells. "$" indicates, that, when transferring a definition to another cell, the address shall remain a reference to the same cell, whereas addresses without preceding "$" will be interpreted as an offset.

Basic Methods

Methods which can be called in cell formulas of a spreadsheet. They are a component of the spreadsheet program. Example: the method MAX(a;b) which applies to the largest of its parameter values as a result.

Design Sheet

Since the size areas of sheets can be changed by expansion, the sheet in which the programmer writes his logic, is referred to as a design sheet, and this form of programming is termed a worksheet example.

Formula (=cell formula in spreadsheets)

Program instruction which, apart from customary bracketing in mathematical expressions, does not contain any explicit specification of the execution sequence of any individual steps of the instruction. This does not rule out indirect influence on the sequence, for example by placing the arguments of a logic "or": A or B, the testing of "B" would no longer be required in the case of A "true". However, in such computational expressions the result is independent of the sequence and the developer can also not be sure that the expected effect (elimination of evaluation of "B") occurs since details of the formula execution of spreadsheet programs are not necessarily disclosed.

Indirect Addressing

In the formula of a cell it is possible to reference other cells not only by directly specifying a row/column number. In Excel, for example the function offset permits the following addressing:
=OFFSET(A1,2*2;15)

In the represented formula the cell E16 is addressed, that is to say the cell which lies 4 rows (=2*2) below A1 and 15 columns along from A1. Such addressing operations which require the calculation of a partial expression of a formula are called indirect here.

Method

Program unit whose execution can be triggered by other program units, which receives data when triggered ("called") by the "caller" ("parameter") and can return data.

Examples: C-function, Java method.

Procedural Programming Languages

Languages in which the program developer defines the sequence in which the individual instructions are to be executed.

Re-Entrant-Compatible

A method is re-entrant-compatible if it can be carried out in a nested fashion, i.e. if it can call itself or if it is called by means of methods which it calls before it is terminated, for example A calls B calls C calls A.

A programming language is re-entrant-compatible if methods of this language are in principle re-entrant-compatible.

Spreadsheet

Programming scheme for a form of nonprocedural programming. A sheet is composed of rows and columns, causing it to be split up into cells. In the cells there may be values (data, for example numbers and strings) and also formulas which can relate in turn to constants or to the result of the formulas of other cells. The programmer merely writes formulas and values and the sequence of the calculation is determined from the dependencies between the formulas without his intervention.

Spreadsheet Program

Program which can directly execute the logic which is represented in spreadsheets. For the spreadsheet program the spreadsheet descriptions are data which is analyzed and the algorithms described in said data are executed in the correct sequence owing to the analysis. Normally in the case of spreadsheet programs, development and execution components are combined in an environment.

Examples: Excel, Lotus-1-2-3

Structurally Identical Formula Areas

Spreadsheet area of cells with identical formula texts—if references to other cells are ignored.

References at the same position in the formula text have to be the same addresses or partially addresses (i.e. column or row) if it is absolute (preceded with "$" in Excel) or have to reference cells at the same row or column offset respectively (offset=distance between the cell under consideration and the referenced cell).

Example:

|   | A      | B |
|---|--------|---|
| 1 | =B1+1  |   |
| 2 | =B2+1  |   |

A1 relates to B1, and A2 to B2. In each case it is the cell which is directly adjacent on the right, the row offset being respectively 0 and the column offset 1. A1:A2 is therefore a structurally identical formula area.

If cells of another sheet are referenced (for example Sheet1!A1), the same definition applies if it is considered that the spreadsheet reference (that is to say here "Sheet1") always has to be the same. Offset from the cell in question is then understood to refer to the distance (in number of cells) from the cell which has the same coordinates in the other sheet as the sheet under consideration.

Transaction

Recurring calculations in a calculation program, which are calculated for each record of a source Transaction Formula A cell formula which is calculated multiply within a transaction.

Transaction Source

Read area into which transaction formulas reference.

Transaction Reference

References of formulas to read areas which define the formulas as transaction formulas—i.e. these formulas are calculated for each row of the read area.

Workbook

Collection of worksheets which are logically connected to one another and stored in a file. All the cells of the workbook in question can be referenced in the formulas. The calculation is carried out, inter alia, at the level of the workbook in order to ensure overall consistency at this level.

Worksheet Area

"Rectangular" extract from a spreadsheet

Cells

Cells are, in terms of the graphic representation in the calculation programs, the basic elements of the program, i.e. both the smallest data unit and the smallest closed arithmetic unit and are addressed by means of a row/column address.

The preceding description of the preferred examples shows the best embodiment of the invention which is known at present to the inventors. However, the description of the examples cannot be viewed as restrictive for the protective scope since it is to be defined only by the appended claims. The person skilled in the art will recognize that he can implement numerous modifications of the invention within the scope of these claims and with the aid of the description.

The invention claimed is:

1. A method for generating a program in a procedural re-entrant compatible programming language for a computer which has access to data of a data source, having the steps:
   creating a spreadsheet using a table calculation program;
   defining logic operations between various cells of the spreadsheet;
   defining an assignment of the data from the data source to the cells of the spreadsheet; and
   generating a source code of a procedural, re-entrant-compatible programming language based on exemplary algorithms represented in the spreadsheet using a generator, which when called, reads data from the data source, executes a logic operation on it and outputs the result of the logic operation,
   and in which the logic operation on the data from data sources and the cells of the calculation program and its further use in formulas of other cells is interpreted using example rows in such a way that, in a form which can be predicted by the developer, specific cell areas are respectively newly executed for each logic unit of a source, which is mapped onto cells of a row of the spreadsheet,
   and wherein some of the logic operations which are formed are recursively dependent, and wherein if recursive dependencies of some of the logic operations formed cannot be detected statically, one or more of the following measures are taken: making a plausible assumption about the method calculation sequence; generating a warning message; and allowing the user to influence the calculation sequence by producing data about the position of the addressed area for the cell areas.

2. The method as claimed in claim 1 in which the result of the logic operation is written again into a data sink.

3. The method as claimed in claim 1, in which the logic operation on the data from data sources and the cells of the calculation program and its further use in formulas of other cells is interpreted by reference to example rows in such a way that from a changed data scope of the sources an adaptation of the spreadsheet is generated in such a way that the spreadsheet processes the additional data in a way which can in principle be predicted by the developer, wherein the measures of the adaptation consist in the generation of additional cells, if appropriate, with a copy of the formulas of adjacent formula cells and the adaptation of cell references into cell formulas.

4. The method as claimed in claim 1, in which the logic operation of the data from data sources and cells of the calculation program and its further use in formulas of other cells is interpreted using example rows in such a way that, in a form which can be predicted by the developer, specific logic units of a source, that is to say specific data of the source which is mapped onto cells of a row of the spreadsheet, are recognized as the last element of a group of similar units and cell formulas can make use of this knowledge of a group change.

5. The method as claimed in claim 1, in which cell formulas are capable of referencing their own current value and thus accumulating data.

6. The method as claimed in claim 1, in which the writing, updating and erasure of data is possible not only in external data sinks but also in a circumscribed cell area of the spreadsheet itself in such a way that this area adapts its size in accordance with these operations, and for other cell formulas it behaves in turn as a data source with which the cell areas of these cell formulas can therefore grow and shrink.

7. The method as claimed in claim 1, in which the result of the logic operation is output as a graphic in the table calculation program.

8. The method as claimed in claim 1, wherein whenever some of the logic operations which are formed are recursively dependent, the calculation sequence for these logic operations is determined dynamically by storing information for each cell of the effective formula areas which indicates whether said cell has already been calculated in a path.

9. A computer program product which, after being loaded into a computer, is capable of executing the method as claimed in one of claims 1-3 and 4-5.

* * * * *